(12) United States Patent
Liang et al.

(10) Patent No.: US 7,408,696 B2
(45) Date of Patent: Aug. 5, 2008

(54) THREE-DIMENSIONAL ELECTROPHORETIC DISPLAYS

(75) Inventors: Rong-Chang Liang, Cupertino, CA (US); David Chen, Buena Park, CA (US)

(73) Assignee: Sipix Imaging, Inc., Fremont, CA (US)

( * ) Notice: Subject to any disclaimer, the term of this patent is extended or adjusted under 35 U.S.C. 154(b) by 388 days.

(21) Appl. No.: 10/841,122

(22) Filed: May 7, 2004

(65) Prior Publication Data

US 2005/0012881 A1    Jan. 20, 2005

Related U.S. Application Data

(63) Continuation-in-part of application No. 10/243,280, filed on Sep. 12, 2002, now abandoned, and a continuation-in-part of application No. 09/518,488, filed on Mar. 3, 2000, now Pat. No. 6,930,818.

(60) Provisional application No. 60/322,173, filed on Sep. 13, 2001.

(51) Int. Cl.
G02B 26/00 (2006.01)
G02F 1/00 (2006.01)
G09G 3/34 (2006.01)

(52) U.S. Cl. .................. 359/296; 359/322; 345/107
(58) Field of Classification Search ................ 359/296, 359/290, 291, 295, 322, 315, 316
See application file for complete search history.

(56) References Cited

U.S. PATENT DOCUMENTS

| 3,229,607 | A | 1/1966 | Battaglia |
| 3,612,758 | A | 10/1971 | Evans et al. |
| 3,668,106 | A | 6/1972 | Ota |
| 3,689,346 | A | 9/1972 | Rowland |
| 3,697,679 | A | 10/1972 | Hathaway |
| 3,885,964 | A | 5/1975 | Nacci |
| 3,892,568 | A | 7/1975 | Ota et al. |
| 3,908,052 | A | 9/1975 | Sanders |
| 3,928,671 | A | 12/1975 | Robusto et al. |
| 4,071,430 | A | 1/1978 | Liebert |
| 4,093,534 | A | 6/1978 | Carter et al. |
| 4,122,484 | A | 10/1978 | Tan |
| 4,150,876 | A * | 4/1979 | Yevick .................. 349/25 |
| 4,190,352 | A | 2/1980 | Bruning |
| 4,217,602 | A | 8/1980 | Thomas et al. |

(Continued)

FOREIGN PATENT DOCUMENTS

CA    2340683    2/2001

(Continued)

OTHER PUBLICATIONS

U.S. Appl. No. 09/518,488, filed Mar. 2000, Liang et al.

(Continued)

*Primary Examiner*—Ricky L Mack
*Assistant Examiner*—Brandi N Thomas
(74) *Attorney, Agent, or Firm*—Howrey LLP

(57) ABSTRACT

This invention relates to three-dimensional (3-D) electrophoretic displays comprising individually sealed cells filled with optically active electrophoretic dispersions, and more particularly to bi-stable, low-power-consumption and sealed microcup-based electrophoretic displays for high-quality three-dimensional imagery applications.

17 Claims, 6 Drawing Sheets

U.S. PATENT DOCUMENTS

| | | | |
|---|---|---|---|
| 4,236,172 A | 11/1980 | Krasnoperov | |
| 4,285,801 A | 8/1981 | Chiang | |
| 4,480,263 A | 10/1984 | Van Merode | |
| 4,655,897 A | 4/1987 | DiSanto et al. | |
| 4,670,744 A | 6/1987 | Buzak | |
| 4,680,103 A | 7/1987 | Beilin Solomon I et al. | |
| 4,719,509 A | 1/1988 | Sakamoto | |
| 4,741,604 A | 5/1988 | Kornfeld | |
| 4,741,988 A | 5/1988 | Van der Zande et al. | |
| 4,836,647 A | 6/1989 | Beard | |
| 4,891,245 A | 1/1990 | Micale | |
| 4,924,257 A | 5/1990 | Jain | |
| 4,995,718 A | 2/1991 | Jachimowicz et al. | |
| 5,177,476 A | 1/1993 | DiSanto et al. | |
| 5,200,120 A | 4/1993 | Sakai | |
| 5,221,982 A | 6/1993 | Faris | |
| 5,274,481 A | 12/1993 | Kim | |
| 5,276,438 A | 1/1994 | DiSanto et al. | |
| 5,279,511 A | 1/1994 | DiSanto et al. | |
| 5,285,236 A | 2/1994 | Jain | |
| 5,380,362 A | 1/1995 | Schubert | |
| 5,398,041 A | 3/1995 | Hyatt | |
| 5,403,518 A | 4/1995 | Schubert | |
| 5,432,526 A | 7/1995 | Hyatt | |
| 5,450,220 A | 9/1995 | Onishi et al. | |
| 5,460,688 A | 10/1995 | DiSanto et al. | |
| 5,573,711 A | 11/1996 | Hou et al. | |
| 5,589,100 A | 12/1996 | Grasso et al. | |
| 5,594,843 A | 1/1997 | O'Neill | |
| 5,652,645 A | 7/1997 | Jain | |
| 5,699,097 A | 12/1997 | Takayama et al. | |
| 5,731,860 A | 3/1998 | Harada et al. | |
| 5,739,889 A | 4/1998 | Yamada et al. | |
| 5,835,174 A | 11/1998 | Clikeman et al. | |
| 5,843,333 A | 12/1998 | Hakemi | |
| 5,872,552 A | 2/1999 | Gordon, II et al. | |
| 5,877,848 A | 3/1999 | Gillette et al. | |
| 5,895,541 A | 4/1999 | Kobayashi et al. | |
| 5,914,806 A | 6/1999 | Gordon, II et al. | |
| 5,930,026 A | 7/1999 | Jacobson et al. | |
| 5,942,154 A | 8/1999 | Kim et al. | |
| 5,956,112 A | 9/1999 | Fujimori et al. | |
| 5,961,804 A | 10/1999 | Jacobson et al. | |
| 5,976,405 A | 11/1999 | Clikeman et al. | |
| 5,985,084 A | 11/1999 | Summersgill et al. | |
| 5,995,190 A | 11/1999 | Nagae et al. | |
| 6,016,159 A | 1/2000 | Faris | |
| 6,017,584 A | 1/2000 | Albert et al. | |
| 6,018,383 A | 1/2000 | Dunn et al. | |
| 6,023,276 A | 2/2000 | Kawai et al. | |
| 6,037,058 A | 3/2000 | Clikeman et al. | |
| 6,040,807 A | 3/2000 | Hamagishi et al. | |
| 6,064,508 A | 5/2000 | Forgette et al. | |
| 6,067,185 A | 5/2000 | Albert et al. | |
| 6,111,598 A | 8/2000 | Faris | |
| 6,113,810 A | 9/2000 | Hou et al. | |
| 6,113,836 A | 9/2000 | Sakai et al. | |
| 6,120,588 A | 9/2000 | Jacobson | |
| 6,120,839 A | 9/2000 | Comiskey et al. | |
| 6,120,946 A | 9/2000 | Johnson et al. | |
| 6,166,797 A | 12/2000 | Bruzzone et al. | |
| 6,172,798 B1 | 1/2001 | Albert et al. | |
| 6,177,216 B1 | 1/2001 | Broer et al. | |
| 6,178,358 B1 | 1/2001 | Colarelli et al. | |
| 6,184,856 B1 | 2/2001 | Gordon, II et al. | |
| 6,191,250 B1 | 2/2001 | Aida et al. | |
| 6,239,896 B1 | 5/2001 | Ikeda | |
| 6,246,382 B1 | 6/2001 | Maguire, Jr. | |
| 6,252,624 B1 | 6/2001 | Yuasa et al. | |
| 6,271,823 B1 * | 8/2001 | Gordon et al. | 345/107 |
| 6,312,304 B1 | 11/2001 | Duthaler et al. | |
| 6,327,072 B1 | 12/2001 | Comiskey et al. | |
| 6,337,761 B1 | 1/2002 | Rogers et al. | |
| 6,387,457 B1 * | 5/2002 | Jiang et al. | 427/466 |
| 6,392,785 B1 | 5/2002 | Albert et al. | |
| 6,392,786 B1 | 5/2002 | Albert | |
| 6,400,430 B2 | 6/2002 | Nakao et al. | |
| 6,400,492 B1 | 6/2002 | Morita et al. | |
| 6,512,626 B1 | 1/2003 | Schmidt | |
| 6,514,328 B1 | 2/2003 | Katoh et al. | |
| 6,525,865 B2 | 2/2003 | Katase | |
| 6,839,158 B2 * | 1/2005 | Albert et al. | 359/296 |
| 6,987,502 B1 * | 1/2006 | Kishi et al. | 345/107 |
| 2001/0009352 A1 | 7/2001 | Moore | |
| 2002/0018043 A1 | 2/2002 | Nakanishi | |
| 2002/0029969 A1 | 3/2002 | Yager et al. | |
| 2002/0126249 A1 | 9/2002 | Liang et al. | |
| 2002/0182544 A1 * | 12/2002 | Chan-Park et al. | 430/311 |
| 2002/0188053 A1 | 12/2002 | Zang et al. | |
| 2002/0196525 A1 | 12/2002 | Chen et al. | |
| 2003/0011560 A1 * | 1/2003 | Albert et al. | 345/107 |
| 2003/0193473 A1 * | 10/2003 | Kawai | 345/107 |
| 2004/0136048 A1 * | 7/2004 | Arango et al. | 359/296 |
| 2004/0227985 A1 * | 11/2004 | Kishi et al. | 359/296 |
| 2005/0000813 A1 * | 1/2005 | Pullen et al. | 204/601 |

FOREIGN PATENT DOCUMENTS

| | | |
|---|---|---|
| DE | 199 27 359.6 | 12/2000 |
| EP | 0 990 942 | 4/2000 |
| EP | 1 065 553 | 1/2001 |
| EP | 1 089 118 | 4/2001 |
| EP | 1 195 603 | 4/2002 |
| JP | 57104116 | 6/1982 |
| JP | 59171930 | 9/1984 |
| JP | 60-205452 | 10/1985 |
| JP | 64-86116 | 3/1989 |
| JP | 02223934 | 9/1990 |
| JP | 02284125 | 11/1990 |
| JP | 02284126 | 11/1990 |
| JP | 6242423 | 9/1994 |
| JP | 2000 035677 | 2/2000 |
| JP | 2000 075497 | 3/2000 |
| JP | 2001 042118 | 2/2001 |
| JP | 2001 056653 | 2/2001 |
| WO | WO 97/04398 | 2/1997 |
| WO | WO 98/57226 | 12/1998 |
| WO | WO 99/08151 | 2/1999 |
| WO | WO 99/53373 | 10/1999 |
| WO | WO 99/56171 | 11/1999 |
| WO | WO 00/03291 | 1/2000 |
| WO | WO 00/36649 | 6/2000 |
| WO | WO 00/60410 | 10/2000 |
| WO | WO 00/77571 | 12/2000 |
| WO | WO 01/67170 | 9/2001 |
| WO | WO 02/01280 | 1/2002 |
| WO | WO 02/01281 | 1/2002 |

OTHER PUBLICATIONS

U.S. Appl. No. 09/606,654, filed Jun. 2000, Liang et al.

Bryning et al., "37.4: Reverse-Emulsion Electrophoretic Display (REED)" *SID 98 Digest* pp. 1018-1021 (1998).

Comiskey et al, "An Electrophoretic Ink for All-printed Reflective Electronic Displays", Letters to Nature, MIT, The Media Laboratory, 20 Ames Street, Cambridge, MA 02139-4307, USA, May 1998, pp. 253-255.

Dalisa, A. L., "Electrophoretic Display Technology", IEEE Trans. Electron Devices, pp. 827-834 (1977).

Drzaic, P.S., "Liquid Crystal Disperions", The PDLC Paradigm, pp. 1-9, (1995).

Harvey, T.G., "Replication Techniques for Micro-optics", SPIE Proc., vol. 3099, pp. 76-82 (1997).

Harbour, J. R., "Subdivided Electrophoretic Display" Xerox Disclosure Journal, US Xerox Corporation, Stamford, Conn., 4(6):705, Nov. 1979, XP002123212.

Hopper, M. A. et al, "An Electrophoretic Display, its Properties, Model and Addressing", IEEE Transactions on Electron Devices, 26(8): 1148-1152 (1979).

Inoue, S. et al., "High Resolution Microencapsulated Electrophoretic Display (EPD) Driven by Poly-Si TFTs With Four-Level Grayscale" *IEEE Transactions on Electron Devices* 49(8), pp. 1532-1539 (2002).

Kazlas, P. et al., "12.1: 12.1 SVGA Microencapsulated Electorphoretic Active Matrix Display for Information Applicances" *SID 01 Digest* 152-155 (2001).

Kishi, E et al, "5.1 Development of In-Plane EPD", Canon Research Center, SID 00 Digest, pp. 24-27.

Lewis, J.C., "Electrophoretic Displays", Allen Clark Research Centre, The Plessey Company Ltd., Caswell, Towcester, Northants, England, pp. 223-240.

Lewis, J.C., et al, "Gravitational, Inter-Particle-Electrode Forces in Electrophoretic Display", Proceedings of the S.I.D., vol. 18/3&4, 1977.

Matsuda, Y. "Newly designed, high resolution, active matrix addressing in plane EPD" *IDW 02 EP2-3* 1341-1344 (2002).

Murau and Singer, "The Understanding the Elimination of Some Suspension Instabilities in an Electrophoretic Display", Philips Laboratories, Briarcliff Manor, NY 10510, Apr. 10, 1978, J. Appl. Phys. 49(9), pp. 4820-4829.

Nakamura, et al, "Development of Electrophoretic Display using Microencapsulated Suspension", NOK Corporation, Kanagawa, Japan & NOK Corporation, Ibaraki, Japan, SID 98 Digest, pp. 1014-1017.

Ota et al., "Developments in Electrophoretic Displays" *Proc. of SID*, vol. 18/3&4, pp. 243-254 (1977).

Ota, et al., "Electrophoretic Image Display (EPID) Panel," Wireless Research Laboratory, Matsushita Electric Industrial Company, Ltd., Osaka, 571, Japan, received Feb. 7, 1973, pp. 832-836, Jul. 1973.

Singer, B. et al, "X-Y Addressable Electrophoretic Display", Proc. SID 18(3/4), pp. 255-266 (1977).

Slafer, W. D. et al, "Continuous Manufacturing of Thin Cover Sheet Optical Media", SPIE Proc., vol. 1663, pp. 324-335 (1992).

Swanson et al., "5.2: High Performance Electrophoretic Displays" *SID 00 Diges*, pp. 29-31 (2000).

Liang, L.C. (Apr. 2004). *Microcup Electronic Paper by Roll-to-Roll Manufacturing Process*. Presentation at the Flexible Displays & Electronics 2004 of Intertech, San Fransisco, California, USA.

Society of Information Display. (2004). *Information Display, SID 2004 Reivew Issue*, 20(3&4), 37-38.

Wang, X., Kiluk, S., Chang, C., Wu, Y., & Liang, R.C. (Feb. 2004). *Mirocup (R) Electronic Paper and the Converting Processes*. Paper presented at the ASID, Nanjing, China. (in Chinese, English translation attached.).

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). *Threshold and Grayscale Stability of Microcup (R) Electronic Paper*. Presentation conducted at the 16th Annual Symposium—Electronic Imaging Science and Technology of IS&T/SPIE, San Jose, California, USA.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Zang, H.M (Oct. 2003). *Microcup (R) Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies, Monthly Report* Oct. 2003, 9-14.

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached, full translation available upon request).

Lee, H., & Liang, R.C. (Jun. 2003) SiPix Microcup(R) Electronic Paper—An Introduction, *Advanced Display*, 3, 4-9 (in Chinese, English abstract attached, full translation available upon request).

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Chen, S.M. (May 2003) The New Applications and the Dynamics of Companies. *TRI.* 1-10. (In Chinese, English abstract attached, full translation available upon request).

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdives. (Dec. 2002) Newly-Developed Color Electronic Paper Promises—Unbeatable Production Efficiency. *Nikkei Microdevices*, 3. (in Japanese, with English translation).

Zang, et al., "Threshold and Grayscale Stability of Microcup® Electronic Paper", *Electronic Imaging Science and Technology*, SPIE vol. 5289: 102-108 (2004).

* cited by examiner

CHARGED PARTICLES IN OPTICALLY SELECTIVE CLC's -
TRADITIONAL UP/DOWN SWITCHING MODE
( ELECTRODES NOT SHOWN )

CHARGED OPTICALLY SELECTIVE CLC PIGMENT PARTICLES IN CONTRAST COLORED (e.g. BLACK) DIELECTRIC SOLVENT - TRADITIONAL UP/DOWN SWITCHING MODE (ELECTRODES NOT SHOWN)

THREE-DIMENSIONAL ELECTROPHORETIC DISPLAYS

This application is a continuation-in-part of U.S. application Ser. No. 10/243,280, filed Sep. 12, 2002 now abandoned; which claims the benefit of U.S. Provisional Application 60/322,173, filed Sep. 13, 2001; and is also a continuation-in-part of U.S. application Ser. No. 09/518,488, filed on Mar. 3, 2000 now U.S. Pat. No. 6,930,818; the contents of the above applications are incorporated herein by reference in their entirety.

FIELD OF THE INVENTION

This invention relates to three-dimensional electrophoretic displays comprising individually sealed cells filled with an electrophoretic dispersion which may be an optically active electrophoretic dispersion. This invention more particularly relates to bi-stable, low-power-consumption and sealed microcup-based electrophoretic displays for high-quality three-dimensional imagery applications.

BACKGROUND OF THE INVENTION

Various techniques have been used in the prior art to record, transmit and display three-dimensional ("3-D" or stereoscopic) still or motion images for broadcasting, entertainment, scientific research, engineering design, medical or military applications. To generate 3-D images, many such conventional techniques call for the use of two camera systems, whereby two different images are taken from slightly different camera angles and locations, so as to simulate the process by which depth is perceived by a pair of eyes separated by the inter-pupil distance. The two images are then superimposed, either before or after transmission, and finally displayed on a display apparatus such as a television or screen. Conceivably, the two superimposed images are somehow "separated" in the eyes of the viewer, such that one eye sees only one image while the other eye sees only the other image, and as a result an illusion of depth is created by simulating normal human vision.

A popular conventional technique for generating and displaying 3-D images is the anaglyphic 3-D process. Essentially, this technique uses color filters, in the form of a pair of colored glasses worn by the viewer, to separate the two images respectively presented to the right and left eyes. Simultaneously, watching the breakdown images with the right eye and the left eye can give the image a three-dimensional look. An example of the anaglyphic process is described in U.S. Pat. No. 3,697,679, entitled "Stereoscopic Television System" and issued to T. Beard, et al.

Another conventional process is the so-called Polaroid process, in which the right and left images are separated by the use of polarized light filters. The right eye image is projected onto a screen through a polarizing filter rotated 45° to the right of vertical, while the left eye image is projected onto the same screen through a polarizing filter rotated 45° to the left of vertical. Similarly, polarized filters are placed in front of each of the eyes of the viewer, causing the proper image to be transmitted to each eye.

A more recent technique for viewing 3-D images is to make the viewer wear a pair of spectacles incorporating liquid crystal shutters. The image on the display alternates between a right-eye view and a left-eye view in a time-multiplexed fashion. If the image is synchronized with the spectacle shutters at a sufficient rate, the viewer can see a flicker-free stereoscopic image. Alternatively, a liquid crystal shutter may also be disposed in front of a display apparatus while the viewer uses a pair of polarized glasses to view the images. As an example, this is disclosed in U.S. Pat. No. 6,252,624 B1, entitled "Three Dimensional Display" and issued to K.Yuasa, et al.

The right and left perspective images of a 3-D video display system may also be spatially multiplexed during the image generation process to produce a multiplexed composite image. During the image display process, the visible light associated with the right and left perspective image components of the composite image are simultaneously displayed, yet with spatially different polarizations. This perspective image blocking or selective viewing process is typically achieved by the use of spectacles incorporating a pair of spatially different polarizing lenses. Alternatively, micropolarizers may be mounted onto the display surfaces to emanate the polarized light of spatially multiplexed images.

Another prior-art 3-D image display system makes use of the spectral properties of both right and left perspective color images and ensures that the right eye of the viewer sees only the right perspective color images and the left eye of the viewer sees only the left perspective color images of a 3-D scenery. As an example, U.S. Pat. No. 4,995,718, entitled "Full Color Three-Dimensional Projection Display" and issued to K. Jachimowicz, et al., teaches a display system that includes three monochrome image sources and utilizes image polarization for color multiplexing. As another example, U.S. Pat. No. 6,111,598, entitled "System and Method for Producing and Displaying Spectrally-Multiplexed Images of Three-Dimensional Imagery for Use in Flicker-Free Stereoscopic Viewing Thereof" and issued to S. Faris, discloses another method and apparatus for producing and displaying pairs of spectrally multiplexed grayscale or color images of a 3-D scenery.

It is clear from the above that central to current 3-D imagery systems is display equipment and methods that are capable of expressing high-quality stereoscopic images in accordance with any one or more of the stereoscopic imaging techniques known to those skilled in the art, including, without limitation to, those techniques described above. Aside from displays based on the conventional cathode-ray tube ("CRT"), various flat panel display equipment and methods have been known, including those based on light emitting diode ("LED"), electroluminescence ("EL"), field emission ("FE"), vacuum fluorescence, AC or DC plasma and liquid crystal displays ("LCD"). Many of these techniques have been applied to stereoscopic imagery systems, each, to a more or less extent, successfully.

Another recent display technology, the electrophoretic display ("EPD"), appears promising but has not been adapted for 3-D imagery systems and applications. An EPD is a non-emissive device based on the electrophoresis phenomenon in which charged pigment particles suspended in a dielectric solvent are influenced by a pair of electrodes. An EPD typically comprises a pair of opposed, spaced-apart, plate-like electrodes, with spacers predetermining a certain distance between the electrodes. At least one of the electrodes, typically on the viewing side, is transparent. The viewing-side plate is usually the top plate. In a passive-type EPD, row and column electrodes on the top and bottom plates respectively are used to drive the displays, whereas an array of thin film transistors ("TFT") on the bottom plate and a common, non-patterned transparent conductor plate on the top plate are required for the active type EPDs. Typically, an electrophoretic fluid, comprising a colored dielectric solvent and charged pigment particles dispersed therein, is enclosed between the two electrodes.

An EPD operates as follows. A voltage difference is imposed between the two electrodes, causing the charged pigment particles to migrate to the plate of a polarity opposite that of the particles. By selectively charging the two plates, the color shown at the top (transparent) plate can be either the color of the solvent or the color of the pigment particles. Reversal of the plate polarity will cause the particles to migrate in the opposite direction, thereby reversing the color shown at the top plate. Furthermore, intermediate color density (or shades of gray) due to intermediate pigment density at the transparent plate may be obtained by controlling the plate charge through a range of voltages.

In addition to the typical reflective mode, U.S. Pat. No. 06,184,856, entitled "Transmissive Electrophoretic Display with Laterally Adjacent Color Cells" and issued to J. G. Gordon II, et al., discloses a transmissive EPD comprising a backlight, color filters and substrates with two transparent electrodes. Each electrophoretic cell sandwiched between the two electrodes serves as a light valve. In the collected state, the particles in the cell are positioned to minimize the coverage of the horizontal area of the cell and allow the backlight to pass through the cell. In the distributed state, the particles are positioned to cover the horizontal area of the cell and scatter or absorb the backlight. The major disadvantage of this EPD device is that the operation of its backlight and color filters consumes a great deal of power, an undesirable feature for hand-held devices such as PDAs (personal digital assistants) and e-books.

EPDs of different pixel or cell structures have been reported in the prior art; for example, M. A. Hopper and V. Novotny, in *IEEE Trans. Electr. Dev.*, 26(8):1148-1152 (1979), teaches a partition-type EPD; U.S. Pat. No. 5,961,804, entitled "Microencapsulated Electrophoretic Display" and issued to J. Jacobson, et al. and U.S. Pat. No. 5,930,026, entitled "Nonemissive Displays and Piezoelectric Power Supplies Therefor" and issued to J. Jacobson, et al., disclose a number of microencapsulated EPD devices. U.S. Pat. No. 3,612,758, entitled "Color Display Device" and issued to P. F. Evans, et al., discloses another type of EPD wherein the electrophoretic cells are formed from parallel line reservoirs or microgrooves. Each of these devices, however, has its problems as noted below.

In a partition-type EPD, there are partitions between the two electrodes for dividing the space into smaller cells to prevent undesired movements of the particles such as sedimentation. However, difficulties are encountered in the formation of the partitions, the filling of the display with the fluid, the enclosure of the fluid in the display and the separation of electrophoretic fluids of different colors or polarization properties from each other. A full color or 3-D image presentation is thus impossible because of the lack of a mechanism to eliminate the undesirable cross-talk due to intermixing of components among the cells.

The use of parallel line reservoirs such as microchannels, microgrooves or microcolumns to form the EPD device has the problem of undesirable particle sedimentation or creaming along the channel or groove direction. The pixel dimensions, particularly the length of the channels or grooves, are too long for an acceptable polarization or color separation for 3-D image or full color presentations, respectively. In addition, the lack of a seamless, air-pocket-free and continuous sealing process to enclose the electrophoretic fluid without undesirable intermixing or cross-talk makes the 3-D image or roll-to-roll manufacturing extremely difficult.

The prior-art microencapsulated EPD devices have a substantially two-dimensional arrangement of microcapsules, each having therein an electrophoretic composition of a dielectric fluid and a dispersion of charged pigment particles that visually contrast with the dielectric solvent. Typically, the microcapsules are prepared in an aqueous solution and, to achieve a useful contrast ratio, have a relatively large size (i.e., 50-150 microns). This large microcapsule size results in a poor scratch resistance and a slow response time for a given voltage because of the relatively large inter-electrode gap dictated by the relative large capsules. Also, the hydrophilic shell of microcapsules prepared in an aqueous solution typically results in sensitivity to high moisture and temperature conditions. To embed the microcapsules in a large quantity of a polymer matrix may obviate these shortcomings, but only at the expense of an even slower response time and/or a lower contrast ratio. To improve the switching rate, a charge-controlling agent is often needed in this type of EPD. However, the microencapsulation process in an aqueous solution imposes a limitation on the type of charge-controlling agents that can be used. Other drawbacks associated with the microcapsule system include poor resolution and poor addressability for color or 3-D applications because of its large capsule size and broad size distribution.

A new EPD apparatus and method was recently disclosed in the following co-pending U.S. patent applications: U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01280) and U.S. Ser. No. 09/784,972, filed on Feb. 15, 2001, all of which are incorporated herein by reference. This new EPD comprises individually sealed cells formed from microcups of well-defined shape, size and aspect ratio. Each such cell is filled with charged pigment particles dispersed in a dielectric solvent.

The above-described sealed microcup structure enables a format flexible and efficient roll-to-roll continuous manufacturing process for the preparation of EPDs. For example, the displays can be prepared on a continuous web of conductor film such as ITO/PET by (1) coating a radiation curable composition onto the ITO/PET film, (2) forming the microcup structure by a microembossing or photolithographic method, (3) filling the microcups with an electrophoretic fluid and sealing the filled microcups, (4) laminating the sealed microcups with the other conductor film and (5) slicing and cutting the display to a desirable size or format for assembling.

One advantage of this EPD design is that the microcup wall is in effect a built-in spacer to keep the top and bottom substrates apart at a fixed distance. The mechanical properties and structural integrity of microcup displays are significantly better than any prior-art displays including those manufactured by using spacer particles. In addition, displays involving microcups have desirable mechanical properties including reliable display performance when the display is bent, rolled or under compression pressure from, for example, a touch screen application. The use of the microcup technology also eliminates the need of an edge seal adhesive, which would limit and predefine the size of the display panel and confine the display fluid inside a predefined area. A conventional display prepared by the edge sealing adhesive method will no longer be functional if the display is cut or a hole is drilled through the display, because the display fluid would leak out. In contrast, the display fluid within a sealed microcup-based display is enclosed and isolated in each cell. Such a sealed microcup-based display may be cut to almost any dimensions without the risk of damaging the display performance due to loss of display fluids in the active areas. In other words, the microcup structure enables a format flexible display manufacturing process, whereby a continuous output of displays may be produced, first in a large sheet format and then cut to any desired size and format. The individually sealed microcup or cell structure is particularly important when cells are filled with fluids of different specific properties such as colors, polarization, retardation and switching rates. Without the microcup structure and the seamless sealing processes, it would be very difficult to prevent the fluids in adjacent areas from intermixing or being subject to cross-talk in applications such as full color and 3-D presentations.

With recent progresses in other elements of the 3-D imagery system (e.g., digital still and video cameras for recording the images, better algorithms for processing the images, and better image compression for transmission of the images), there is an urgent need in the art for displays that (1) have attributes such as greater format and size flexibility, better image quality including wider viewing angles, better sunlight readability, lower power-consumption and lower manufacturing cost, (2) are light-weight, thin and flexible and (3) are compatible with and adaptable for 3-D imagery systems and applications.

SUMMARY OF THE INVENTION

Accordingly, it is an object of the present invention to provide a display apparatus and method, particularly an EPD, suitable for stereoscopic systems and applications.

Another object of the present invention is to provide a stereoscopic display apparatus and method having superior image qualities such as contrast ratio, color saturation, reflectivity, switching rate and resolution.

Still another object of the present invention is to provide a reflective/transflective stereoscopic display that is thin, flexible and light weight.

Yet another object of the present invention is to provide a stereoscopic display apparatus that is format and size flexible.

A further object of the present invention is to provide a stereoscopic display that is durable, fault-tolerant and easy to maintain.

Still a further object of the present invention is to provide a stereoscopic display that is bi-stable and of low power consumption, and requires low voltage to operate.

Yet a further object of the present invention is to provide a stereoscopic display that can be manufactured by a roll-to-roll process at low cost.

In the present invention, optically active electrophoretic fluids comprising right hand (R-) or left hand (L-) type of cholesteric liquid crystals (CLCs) or charged CLC pigment particles are used in adjacent microcups to selectively reflect only the R- or L-type of optically selective image to one of the viewer's eyes and simultaneously transmit only the mirror image to the viewer's other eye through a pair of viewing pieces having mirror circular polarizations. Simultaneously, watching the breakdown images gives the image a three-dimensional look.

According to one aspect of the present invention, an optically active electrophoretic dispersion may comprise charged pigment particles dispersed in R- or L-type of optically selective CLCs that selectively reflects R- or L-type of light such as red ("R"), green ("G") or blue ("B") back to the viewer.

According to another aspect of the present invention, an optically active electrophoretic dispersion may comprise charged R- or L-type of optically selective CLC pigment particles dispersed in a dielectric solvent. The optically selective CLC pigment particles selectively reflects R- or L-type of light such as "R", "G" or "B" back to the viewer.

These types of 3-D displays may have the traditional up/down, the in-plane or the dual switching mode.

According to yet another aspect of the present invention, charged pigment particles are dispersed in a colorless dielectric solvent. An array of optically selective CLC color filter layers which selectively reflect R- or L-type of light such as "R", "G" or "B" back to the viewer is attached to the electrophoretic cells. In plane switching circuitry is used in this particular embodiment.

An advantage of the present invention is that the performance of the new stereoscopic display apparatus is not sensitive to viewing angle and environmental lighting condition.

Another advantage of the present invention is that the new stereoscopic display apparatus and method can be made by either a continuous or batch process at low cost.

These and other objects, features and advantages of the present invention will become apparent to those skilled in the art after having read the following detailed description of the preferred embodiments, which are illustrated in several drawings.

DETAILED DESCRIPTION OF THE INVENTION

Unless defined otherwise in this specification, all technical terms are used herein according to their conventional definitions as they are commonly used and understood by those of ordinary skill in the art.

The term "microcup" refers to the cup-like indentations created by microembossing or imagewise exposure.

The term "cell", in the context of the present invention, is intended to mean the single unit formed from a sealed microcup. The cells are filled with an electrophoretic dispersion which may be an optically active electrophoretic dispersion.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the microcups.

Figure 1:
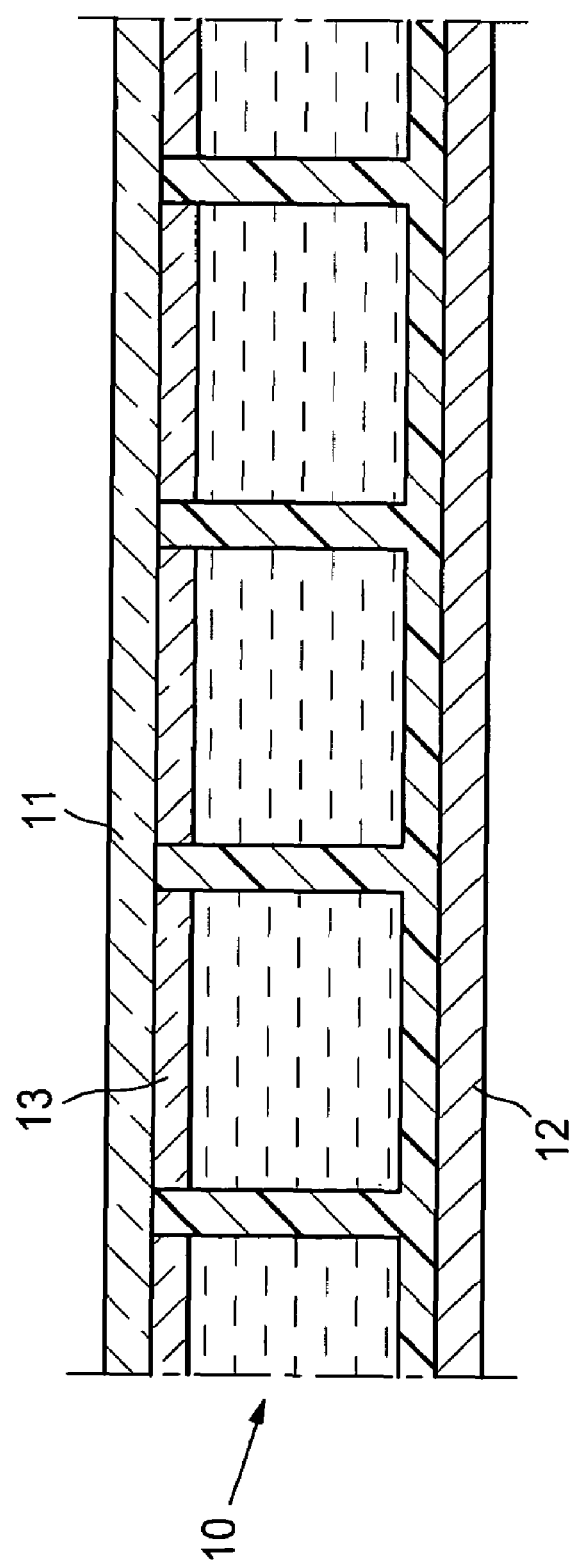
FIG. 1 is a general schematic representation of several cells of a sealed microcup-based electrophoretic display apparatus.

FIG. 1 is a general depiction of an array of sealed microcup-based electrophoretic cells. The cells (10) are sandwiched between a top layer (11) and a bottom layers (12). The cells are filled with an electrophoretic dispersion and are also individually sealed with a sealing layer (13). The microcup-based cells may be prepared by microembossing or photolithography as disclosed in the co-pending U.S. applications, U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01280) and U.S. Ser. No. 09/784,972, filed on Feb. 15, 2001.

The display may have the traditional up/down switching mode, the in-plane switching mode or the dual switching mode.

In the display having the traditional up/down switching mode or the dual switching mode, there are a top transparent electrode plate, a bottom electrode plate and the individually sealed cells are enclosed between the two electrode plates. The up/down mode allows the charged particles to move in the vertical (up/down) direction whereas the dual switching mode allows the particles to move in either the vertical (up/down) direction or the planar (left/right) direction.

In the display having the in-plane switching mode, the cells are sandwiched between a top transparent insulator layer and a bottom electrode plate. The in-plane switching mode allows the particles to move in the planar direction only.

While the present invention may be embodied in many forms, details of the preferred embodiments are schematically shown in FIGS. 2-5, with the understanding that the present disclosure is not intended to limit the invention to the embodiments illustrated.

Figure 2:
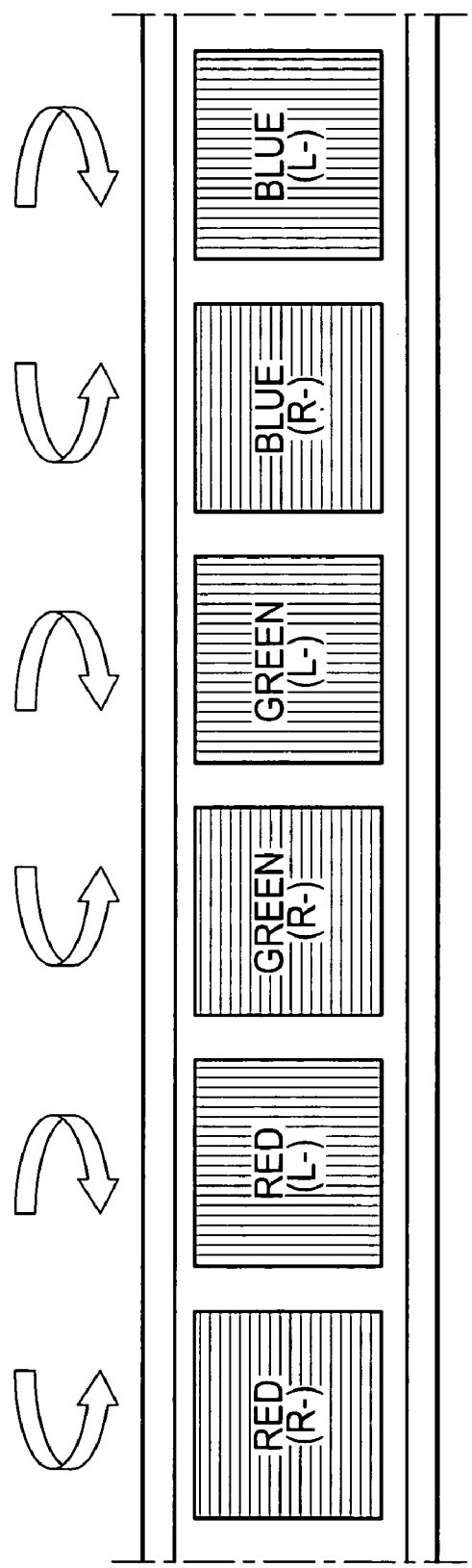
FIG. 2 is a schematic representation of several cells of a sealed microcup-based, color display apparatus of the present invention.

According to one aspect of the present invention, a display that can be used to decode 3-D information is made by enclosing within sealed microcup-based cells R- and L-types of CLCs or CLC particles that selectively reflect R- or L-type of red ("R"), green ("G") or blue ("B") light as shown in FIG. 2.

Figure 3:
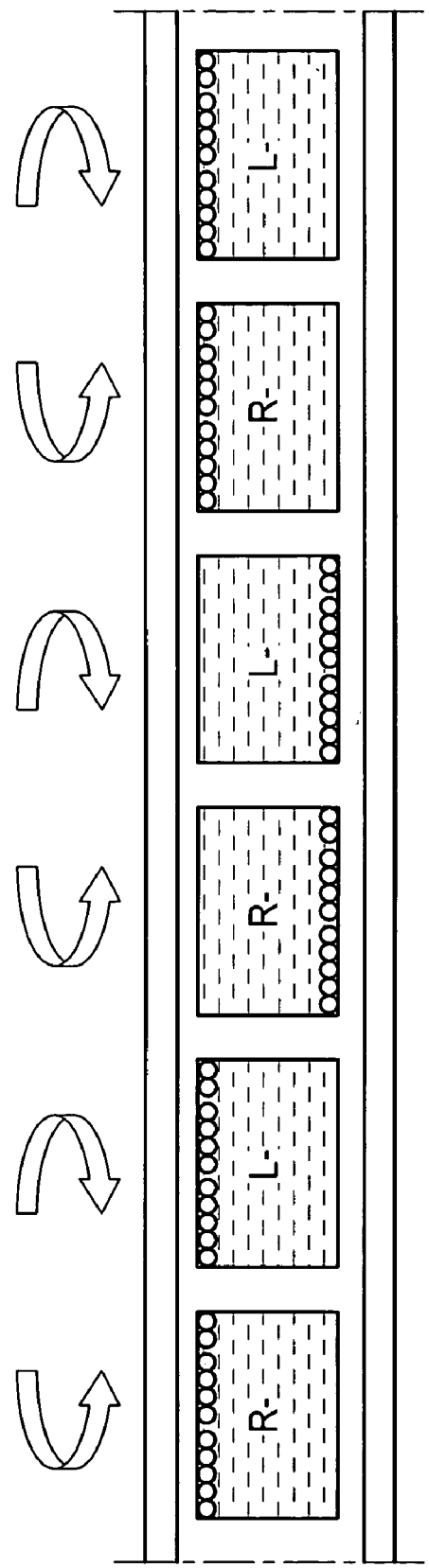
FIG. 3 is a schematic representation of several cells of a sealed microcup-based, monochrome electrophoretic display apparatus of the present invention containing charged pigment particles dispersed in optically selective, right hand (R-) or left hand (L-) type of CLCs.

In accordance with one specific embodiment of the present invention, a sealed microcup-based electrophoretic display ("EPD") can be made and used as the display device of a variety of 3-D imagery systems as shown in FIG. 3. The EPD comprises cells that contain charged pigment particles dispersed in optically selective CLCs. The charged particles can be either black or white (not shown), and the CLCs can be "R"(R-), "R"(L-), "G"(R-), "G"(L-), "B"(R-) or "B"(L-). The notations, "R", "G", "B", (R-) and (L-) stand for red, green, blue, right hand type and left hand type, respectively, as conventionally used in the art.

Figure 4A:
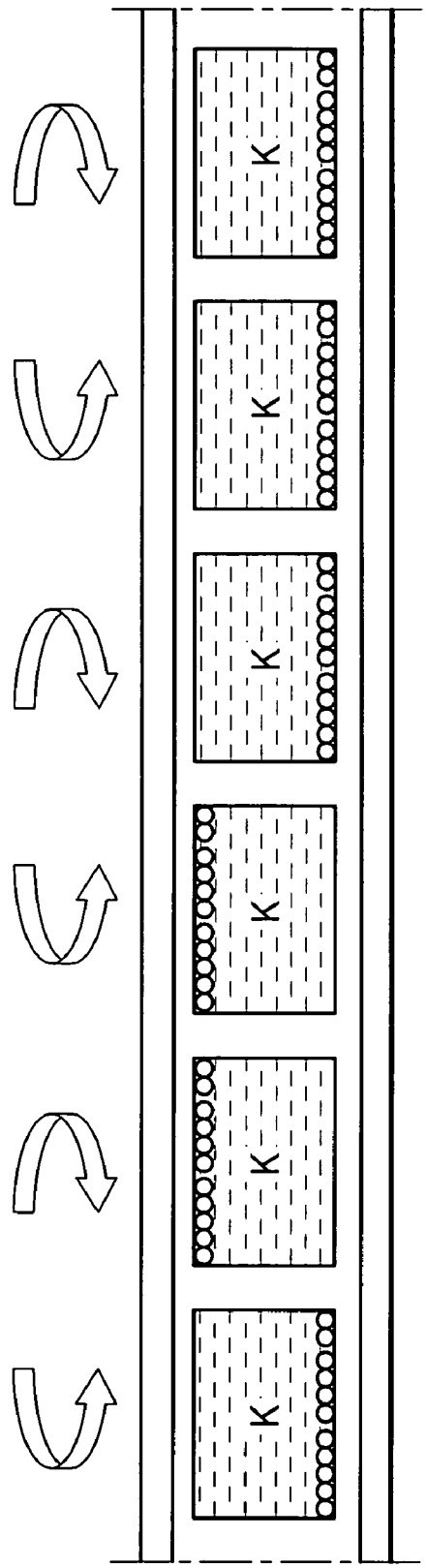
FIG. 4A is a schematic representation of several cells of a sealed microcup-based, monochrome electrophoretic display apparatus of the present invention containing charged, optically selective, R- or L-type CLC particles in a contrast colored (black, "K") dielectric solvent. The display as shown has a traditional up/down switching mode.
Figure 4B:
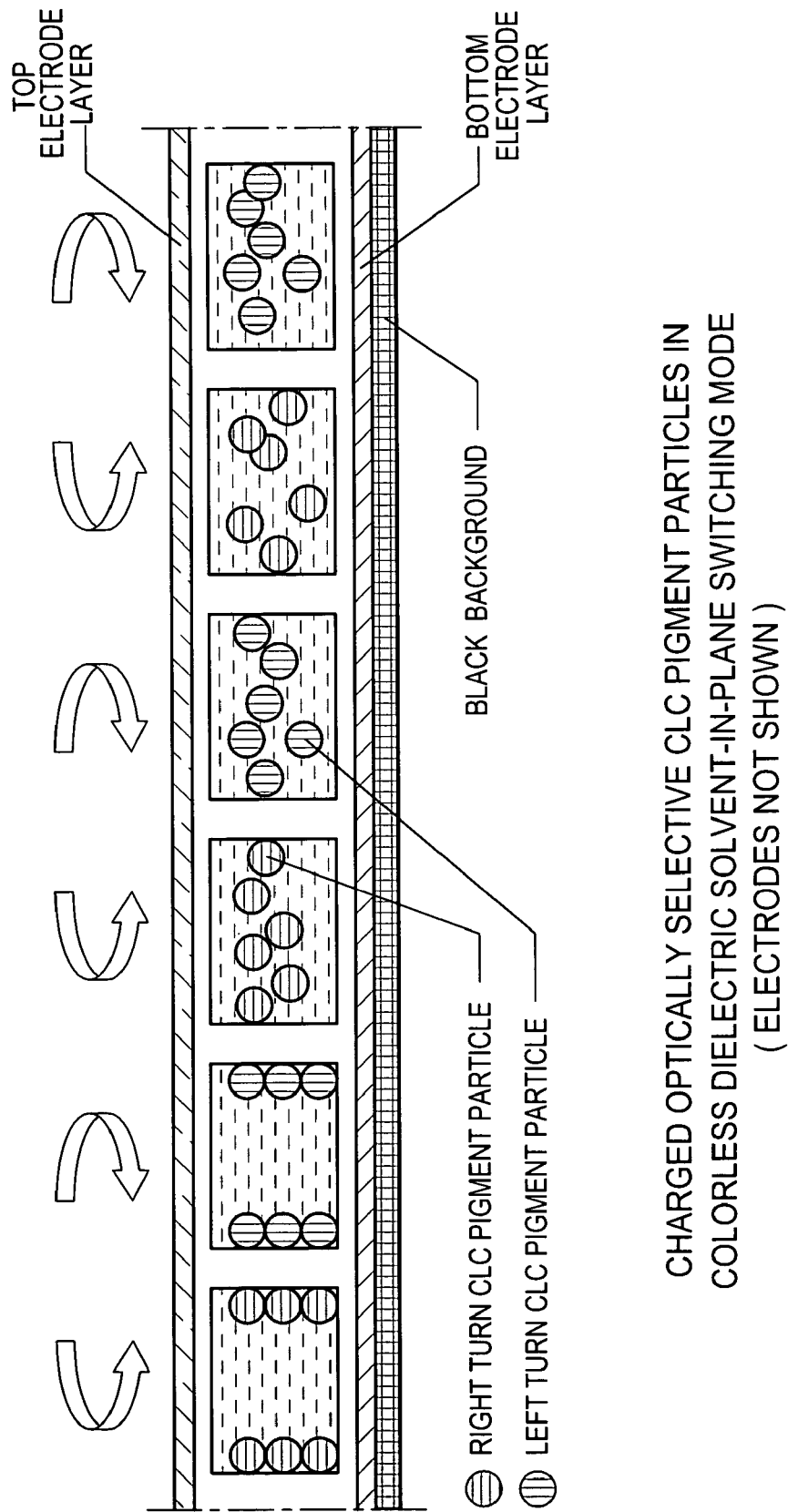
FIG. 4B is a schematic representation of several cells of a sealed microcup-based, monochrome electrophoretic display apparatus of the present invention containing charged, optically selective, R- or L-type CLC particles in a colorless dielectric solvent. The display as shown has an in-plane switching mode.

In accordance with another specific embodiment of the present invention, a sealed microcup-based EPD can be made and used as the display device of a variety of 3-D imagery systems as shown in FIGS. 4A and 4B. The EPD comprises cells that contain charged, optically selective, CLC particles dispersed in a dielectric solvent. Each cell of the display contains a type of CLC particle selected from the following: "R"(R-), "R"(L-), "G"(R-), "G"(L-), "B"(R-) or "B"(L-) CLC particles. The dielectric fluid may be colored such as black in the case of the conventional up/down switching mode (FIG. 4A) or colorless in the case of the in-plane switching mode (FIG. 4B). Optionally a color (such as black) background may be used as shown in FIG. 4B.

In FIG. 4A, when the charged optically selective CLC pigment particles migrate to the top transparent electrode plate, the viewer will see a colored 3-D image and when the CLC pigment particles migrate to the bottom electrode plate, the viewer will see the color of the solvent (i.e., black).

In FIG. 4B, when the charged optically selective CLC pigment particles migrate to the sides of the cells, the viewer will see the color of the background (i.e., black) and when the CLC pigment particles are in a distributed state, the viewer will see a colored 3-D image.

Figure 5:
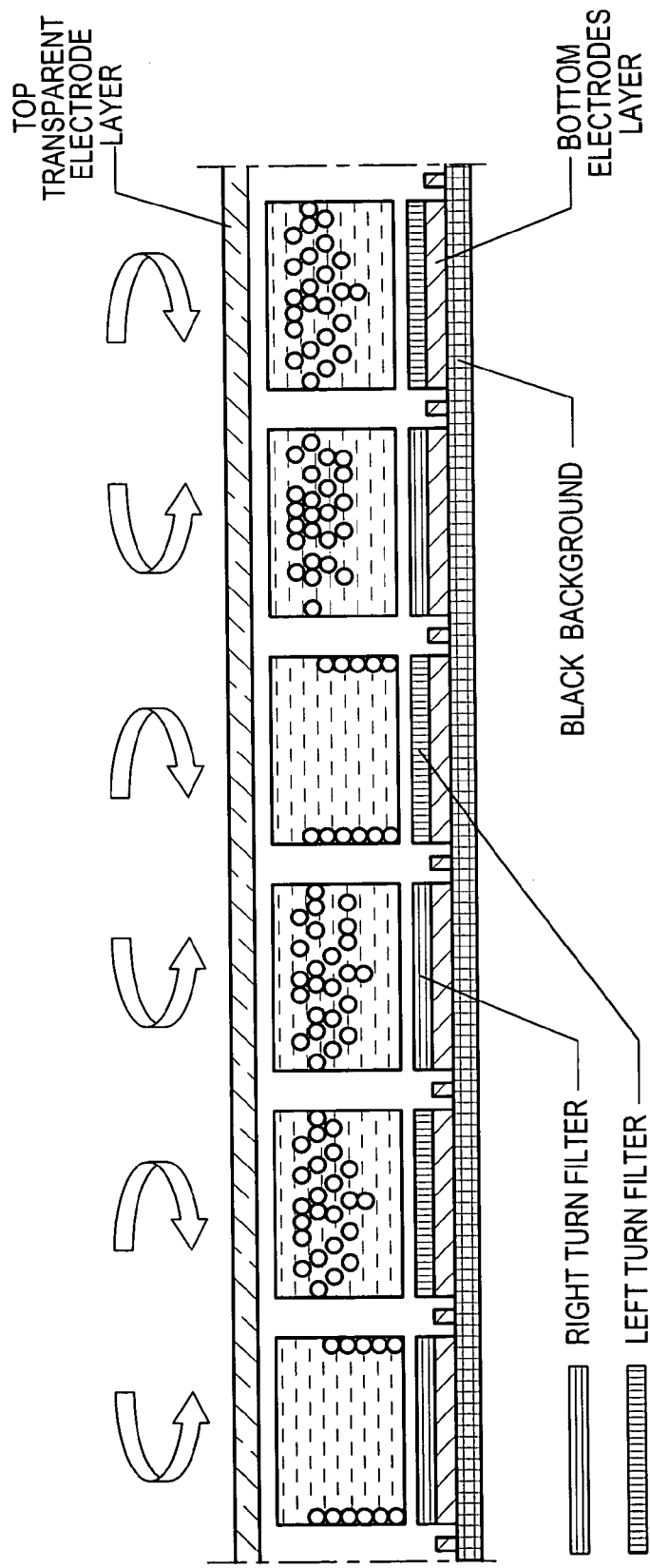
FIG. 5 is a schematic representation of several cells of a sealed microcup-based, monochrome display apparatus of the present invention comprising charged pigment particles dispersed in a colorless dielectric solvent and the display as shown has CLC color filters which selectively reflect R- or L-type of light such as red, green or blue back to the viewer.

In accordance with still another specific embodiment of the present invention, a display comprising a multitude of sealed microcup-based cells can be made and used as the display device of a variety of 3-D imagery systems as shown in FIG. 5. Each cell of the display contains charged, black or white pigment particles dispersed in a colorless dielectric solvent, and a CLC color filter which selectively reflects R- or L-type of light such as red, green or blue back to the viewer is placed with each cell, either on the cell bottom as shown in FIG. 5, or at the top of the cell. FIG. 5 also shows the display driven by an in-plane switch mode. When the particles migrate to the sides of the cell, the viewer sees the R- or L-type of light from the optically selective colored background and hence a 3-D image. When the particles are dispersed in the cell, the viewer sees the color of the particles.

The sealing of the microcup-based cells is disclosed in co-pending applications U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01280), and U.S. Ser. No. 09/784,972, filed on Feb. 15, 2001. The sealing of the microcups may be accomplished in a number of ways. A preferred approach is to disperse a UV curable composition into the electrophoretic dispersion which may be an optically active electrophoretic dispersion described above or an electrophoretic dispersion as disclosed in U.S. Ser. No. 09/518,488. The UV curable composition which may contain a multifunctional acrylate, an acrylated oligomer and a photoinitiator is immiscible with the electrophoretic dispersion and has a specific gravity lower than that of the electrophoretic dispersion. The two components, UV curable composition and the electrophoretic dispersion, are thoroughly blended in an in-line mixer and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as isopropanol, methanol or an aqueous solution mixture thereof may be used to clean the residual electrophoretic dispersion on the top surface of the partition walls of the microcups. Volatile organic solvents may be used to control the viscosity and coverage of the electrophoretic dispersion. The thus-filled microcups are then dried and the UV curable composition floats to the top of the electrophoretic dispersion. The microcups may be sealed by curing the supernatant UV curable layer during or after it floats to the top. UV or other forms of radiation such as visible light, IR and electron beam may be used to cure the composition and seal the microcups. Alternatively, heat or moisture may also be employed to seal the microcups, if appropriate heat or moisture curable compositions are used.

Although the present invention has been described above in terms of several specific embodiments, it is anticipated that alterations and modifications thereof will no doubt become apparent to those skilled in the art having read the above detailed description of the embodiments. It is therefore intended that the following claims be interpreted as covering all such alterations and modifications as fall within the true spirit and scope of the invention.

What is claimed is:

1. A 3-D display comprising an array of cells wherein said cells are filled with an optically active electrophoretic dispersion and are sealed with a sealing layer formed on top of the optically active electrophoretic dispersion from a sealing composition having a specific gravity lower than that of the optically active electrophoretic dispersion.

2. The 3-D display of claim 1 wherein said optically active electrophoretic dispersion comprises R- or L-type of CLC or charged CLC pigment particles.

3. The 3-D display of claim 1 wherein said optically active electrophoretic dispersion comprises charged pigment particles dispersed in R- or L-type of optically selective CLCs.

4. The 3-D display of claim 3 wherein said charged pigment particles are of the white color.

5. The 3-D display of claim 3 wherein said charged pigment particles are of the black color.

6. The 3-D display of claim 3 wherein said R- or L-type of optically selective CLCs are of the red, blue or green color.

7. The 3-D display of claim 1 wherein said optically active electrophoretic dispersion comprises charged R- or L-type of optically selective CLC pigment particles dispersed in a dielectric solvent.

8. The 3-D display of claim 7 wherein said charged R- or L-type of optically selective CLC pigment particles are of the red, green or blue color.

9. The 3-D display of claim 7 wherein said dielectric solvent is colored.

10. The 3-D display of claim 9 wherein said dielectric solvent is black.

11. A 3-D display comprising
a) an array of cells of well-defined shape, size and aspect ratio, and said cells are filled with an electrophoretic dispersion comprising charged pigment particles dispersed in a dielectric solvent and sealed with a sealing layer formed on top of the electrophoretic dispersion from a sealing composition having a specific gravity lower than that of the electrophoretic dispersion; and
b) optically selective R- or L-type of CLC color filters.

12. The 3-D display of claim 1 which has an up-down, in-plane or dual switching mode.

13. The 3-D display of claim 11 which has an up-down, in-plane or dual switching mode.

14. The 3-D display of claim 1 wherein said sealing composition is a radiation curable composition.

15. The 3-D display of claim 1 wherein said sealing composition is a heat or moisture curable composition.

16. The 3-D display of claim 11 wherein said sealing composition is a radiation curable composition.

17. The 3-D display of claim 11 wherein said sealing composition is a heat or moisture curable composition.

* * * * *